Figure 1:
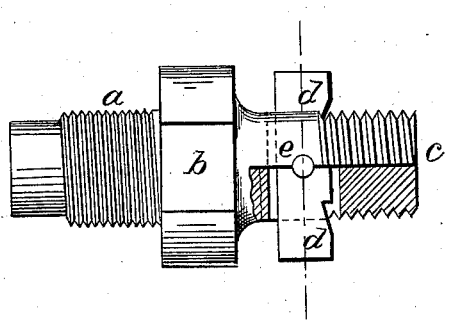

H. F. WHEELER.
Dressing Metal Nuts.

No. 80,792.          Patented Aug. 4, 1868.

WITNESSES

INVENTOR:

United States Patent Office.

HENRY F. WHEELER, OF BOSTON, MASSACHUSETTS.

Letters Patent No. 80,792, dated August 4, 1868.

---

IMPROVED NUT-SQUARING CHUCK.

---

*The Schedule referred to in these Letters Patent and making part of the same.*

---

TO ALL WHOM IT MAY CONCERN:

Be it known that I, HENRY F. WHEELER, of Boston, in the county of Suffolk, and State of Massachusetts, have invented an Improved Nut-Squaring Chuck; and I do hereby declare that the following, taken in connection with the drawings which accompany and form part of this specification, is a description of my invention sufficient to enable those skilled in the art to practise it.

After nut-blanks are forged or punched, screw-threads are formed therein, and all the surfaces of the nuts afterwards finished are intended to bear definite and positive relations to the axial line of the screw-threaded hole. One end, at least, of each nut is intended to be square to said axial line, and, heretofore, the screw-threaded but otherwise rough blank has been screwed upon a square-threaded chuck, having a fixed collar, with a face made square to the axis on which the chuck rotates. But as the end faces of a rough blank are by no means true and square with the axis of the screw-threaded hole formed therein, one end of the nut bears against the fixed collar of the chuck only upon one side, or at one point, and thus, when there is the least play or freedom between the threads of the chuck and the threads of the nut-blank, it follows that, when the nut-blank is screwed upon the chuck, hard against the collar thereon, the nut-blank is crowded to one side, so that its threads are not truly concentric with the axis of rotation of the chuck, and hence, when the cutting-tool is made to operate on the end of the nut, said end is not made square with its axial line, and, when the nut is reversed upon the chuck, its faced end comes against the fixed collar on the chuck, and the other end will be made parallel with the end first faced.

Where exactness in the construction of nuts has been required, it has been the practice to screw them upon arbors screw-threaded and slightly taper, until the taper of the arbor caused the nut to bind thereupon sufficiently to prevent the turning of the nut under the action of the tool used for squaring up one end-face. But the operation of screwing the nuts upon and off from the screw-threaded taper arbor consumes time unnecessarily, and is apt to enlarge or stretch the nut.

The object of my invention is to facilitate and expedite the operation of squaring up the ends of nuts, and to render it certain that the inequalities or lack of perfect form of the ends of a nut-blank, with reference to the threaded hole therein, shall not cause the nut-blank to assume a distorted position upon the chuck, on which the ends are faced, and my invention consists in the construction of a chuck, substantially as described, by which the proper position of a nut on its chuck shall be secured, so as to render certain squareness of the ends of a nut with the axis of its threaded hole.

The drawings are an illustration of a chuck embodying my invention—

Figure 1 showing said chuck partly in longitudinal elevation, and partly in section.

Figure 2:
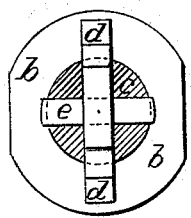

Figure 2 being a sectional end elevation of the chuck.

The end $a$ of the chuck is threaded, so as to screw into a revolving spindle, till the collar $b$ abuts against the end of said spindle, the collar being flattened on opposite sides, to permit the application of a wrench. The other end, $c$, of the chuck is made with screw-threads fitting and corresponding to the threads formed in the nut-blanks which are to be end-faced thereon. This end $c$ is mortised through, and the piece $d$ is pivoted in the mortise on the pin $e$, so that piece $d$ can move freely on said pin, the piece $d$ forming the shoulder against which one end of each nut bears, whilst the other end is subjected to the operation of a cutting-tool.

It will be seen that, if one side of the end of a nut-blank, when screwed upon the end $c$ of the chuck, touches one end of the piece $d$, before the other side touches the other end of said piece, then the piece $d$ will move on its pivot, till both ends of said piece bear fairly against opposite sides of the adjacent end-face of the nut, which, in such case, will not be crowded to one side or the other, but will be held firmly on the chuck, with its threads concentric with the axis of the chuck.

It is not, however, necessary, in order to embody the gist of my invention, that the movable shoulder $d$, which checks and holds the nut against the action of the boring-tool, should be of the exact form shown, or located in a mortise through the chuck, as described, as the movable shoulder may be otherwise applied, it being sufficient for the embodiment of my invention that the shoulder is arranged to yield to side pressure, so as to take a bearing on the face or end of a nut at nearly opposite points.

I claim a chuck, for the purpose described, as made with the screw-threaded end $c$, provided with a movable shoulder, $d$, arranged to operate substantially as set forth.

H. F. WHEELER.

Witnesses:
   J. B. CROSBY,
   FRANCIS GOULD.